United States Patent
Cho et al.

(10) Patent No.: US 6,954,573 B2
(45) Date of Patent: Oct. 11, 2005

(54) WIDE BAND DISPERSION-CONTROLLED FIBER

(75) Inventors: Jeong-Sik Cho, Kumi-shi (KR);
Mun-Hyun Do, Kyongsangbuk-do (KR); Jin-Seong Yang, Kumi-shi (KR); Sung-Wook Choi, Taegu-Kwangyok-shi (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 180 days.

(21) Appl. No.: 10/188,477

(22) Filed: Jul. 3, 2002

(65) Prior Publication Data

US 2003/0103747 A1 Jun. 5, 2003

(30) Foreign Application Priority Data

Nov. 30, 2001 (KR) ........................................ 2001-75152

(51) Int. Cl.[7] .............................. G02B 6/16; H04J 14/02
(52) U.S. Cl. ........................ 385/123; 385/124; 385/126; 385/127; 385/141; 398/81
(58) Field of Search ................................. 385/123, 124, 385/125, 126, 127, 141; 398/81

(56) References Cited

U.S. PATENT DOCUMENTS

| | | | | |
|---|---|---|---|---|
| 4,163,654 A | | 8/1979 | Krohn et al. ................... | 65/385 |
| 4,715,679 A | * | 12/1987 | Bhagavatula ................ | 385/127 |
| 5,673,354 A | * | 9/1997 | Akasaka et al. ............. | 385/127 |
| 6,363,196 B1 | * | 3/2002 | Rousseau et al. ........... | 385/127 |
| 6,421,490 B1 | * | 7/2002 | Liu .............................. | 385/127 |
| 6,430,347 B1 | * | 8/2002 | Cain et al. .................... | 385/123 |
| 6,445,864 B2 | * | 9/2002 | Jiang et al. ................... | 385/127 |
| 6,591,048 B2 | * | 7/2003 | Mukasa ........................ | 385/123 |
| 2002/0044738 A1 | * | 4/2002 | Jablonski et al. ............. | 385/27 |
| 2002/0060865 A1 | * | 5/2002 | Jablonski et al. ............ | 359/850 |
| 2004/0001681 A1 | * | 1/2004 | Yamamoto et al. .......... | 385/123 |

FOREIGN PATENT DOCUMENTS

| | | | |
|---|---|---|---|
| JP | 53-131054 | 11/1978 | ............ G02B/5/14 |
| JP | 54-142322 | 11/1979 | ........... C03B/37/00 |
| JP | 57-032404 | 1/1982 | ........... G02B/5/172 |
| JP | 63-271311 | 9/1988 | ............. G02B/6/22 |
| JP | 10-206654 | 8/1998 | ............. G02B/6/00 |
| JP | 2001-010837 | 1/2001 | ......... G02B/37/012 |
| WO | WO 00/62106 | 10/2000 | ............ G02B/6/16 |
| WO | WO 00/67053 | 11/2000 | ............ G02B/6/16 |
| WO | WO 01/25828 | 4/2001 | ............ G02B/6/00 |
| WO | WO 01/71391 | 9/2001 | ............ G02B/6/00 |

OTHER PUBLICATIONS

Pierre–Luc Francois; "Tolerance Requirements for Dispersion Free Single–Mode Fiber Design: Influence of Geometrical Parameters, Dopant Diffusion, and Axial Dip;"; IEEE Transactions on Microwave Theory and Techniques, vol. MTT–30, No. 10; Oct. 1982; 10 pages.

\* cited by examiner

*Primary Examiner*—Brian M. Healy
(74) *Attorney, Agent, or Firm*—Cha & Reiter, L.L.C.

(57) ABSTRACT

A wide band dispersion-controlled fiber which comprises a core forming an optical signal transmission path and having a peak refractive index, and a cladding surrounding the core and having a peak refractive index lower than the peak refractive index of the core. The wide band dispersion-controlled fiber further comprises at least one dispersion control layer arranged between the core and the cladding and having a refractive index profile such that its refractive index increases from an inner periphery to an outer periphery. The minimum refractive index of the dispersion control layer is less than the peak refractive indices of the core and cladding.

8 Claims, 8 Drawing Sheets

WIDE BAND DISPERSION-CONTROLLED FIBER

PRIORITY

This application claims priority to an application entitled "WIDE BAND DISPERSION-CONTROLLED FIBER", filed in the Korean Industrial Property Office on Nov. 30, 2001 and assigned Serial No. 2001-75152, the contents of which are hereby incorporated by reference.

BACKGROUND OF THE INVENTION

1. Field of the Invention

The present invention relates to an optical fiber. More particularly, the present invention relates to a dispersion-controlled fiber.

2. Description of the Related Art

In general, the dispersion characteristics of an optical fiber can be effectively controlled by positioning a region of a depressed refractive index between a core and a cladding of the fiber. This is disclosed in U.S. Pat. No. 4,715,679 (title: "LOW DISPERSION, LOW-LOSS SINGLE-MODE OPTICAL WAVEGUIDE") invented by and issued to Venkata A. Bhagavatula, the contents of which are incorporated by reference as background material.

FIG. 1 is a graph illustrating prior art dispersion characteristics of a single-mode fiber (SMF). In this illustration, a dispersion curve 110 for the SMF is shown. The SMF has a step-index profile because there is no region having a depressed refractive index. As seen from the dispersion curve 110, the SMF has a unit dispersion value of about 17 ps/nm/km at a wavelength of 1550 nm. If the SMF is used for a long distance transmission, an accumulated dispersion of an optical signal received through the SMF is increased and, as a result, a distortion of the optical signal becomes more severe. There are various dispersion compensation techniques in the prior art for minimizing the accumulated dispersion occurring during the long distance transmission of the optical signal. Generally, a method of using a dispersion-controlled fiber has been widely employed to minimize the accumulated dispersion.

Dispersion-controlled fiber has a high negative dispersion value because of a depressed refractive index region surrounding its core. Further, the dispersion-controlled fiber can be connected to one end of the SMF to compensate for the accumulated dispersion of the SMF. The dispersion-controlled fiber has a high negative unit dispersion value at a wavelength of 1550 nm and its length may be adjusted to offset the accumulated dispersion of the SMF, so that the total dispersion becomes zero.

However, if the dispersion-controlled fiber is adapted for dispersion compensation of the SMF, a sum of an accumulated dispersion of the dispersion-controlled fiber and the accumulated dispersion of the SMF may not be zero at wavelengths other than 1550 nm. In this regard, there is a problem in which it is not appropriate to apply the dispersion-controlled fiber to a wavelength division multiplexing system.

In order to overcome the above problem, research has recently been done to provide a fiber capable of compensating for both a dispersion and a dispersion slope together. To compensate for both the dispersion and dispersion slope, it is required to let a dispersion value and dispersion slope of the SMF be $D_{SMF}$ and $DS_{SMF}$ and those of the dispersion-controlled fiber be $D_{DCF}$ and $DS_{DCF}$, respectively, such that the $D_{DCF}$ and $DS_{DCF}$ satisfy the following equation 1.

$$D_{SMF}:DS_{SMF} \cong D_{DCF}:DS_{DCF} \quad \text{[Equation 1]}$$

If the dispersion and dispersion slope ($D_{DCF}$ and $DS_{DCF}$) of the dispersion-controlled fiber satisfy equation 1, compensation for the accumulated dispersion of the SMF occurs not only at a wavelength of 1550 nm, but also at wavelengths other than 1550 nm. However, there is a great deal of difficulty implementing a fiber that perfectly satisfies equation 1 over the entire wavelength range. For this reason, the current state of the art simply compensates for the dispersion and dispersion slope at C-band wavelengths of 1530–1570 nm. In a wide band wavelength division multiplexing system, there is a need to perform the dispersion and dispersion slope compensations at any wavelength in a range of wavelengths including an S-band of 1450–1530 nm and L-band of 1570–1610 nm as well as the C-band.

SUMMARY OF THE INVENTION

Therefore, the present invention provides a dispersion-controlled fiber applicable to a wide band wavelength division multiplexing system, with such a wide band wavelength being heretofore unknown in the art.

In accordance with the present invention, the above and other objects can be accomplished by providing a wide band dispersion-controlled fiber comprising a core forming an optical signal transmission path and having a peak refractive index, and a clad surrounding the core and having a peak refractive index lower than the peak refractive index of the core, further comprising at least one dispersion control layer arranged between the core and the cladding and having a refractive index profile such that its refractive index is increased from an inner periphery of the dispersion control layer having a minimum refractive index lower than the peak refractive indices of the core and cladding to its outer periphery.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a variety of specific elements such as constituent elements are described. The description of such elements has been made only for a better understanding of the present invention. Those skilled in the art will appreciate that various modifications, additions, and substitutions to the specific elements are possible, without departing from the scope and spirit of the invention as disclosed in the accompanying claims.

Figure 1:
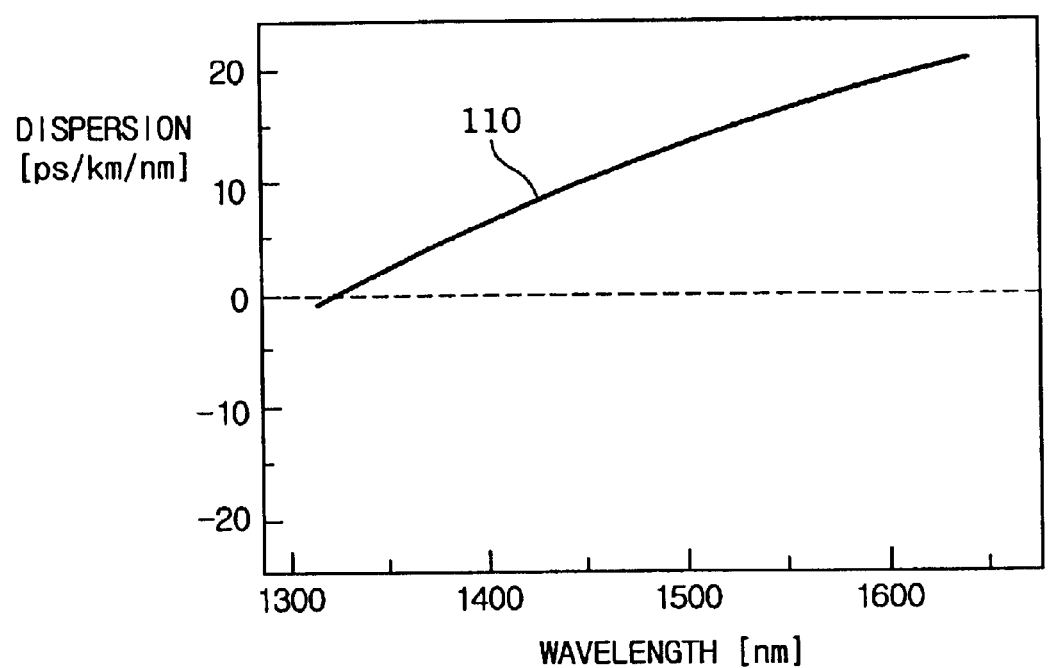
FIG. 1 is a graph illustrating conventional dispersion characteristics of a single-mode fiber.
Figure 2:
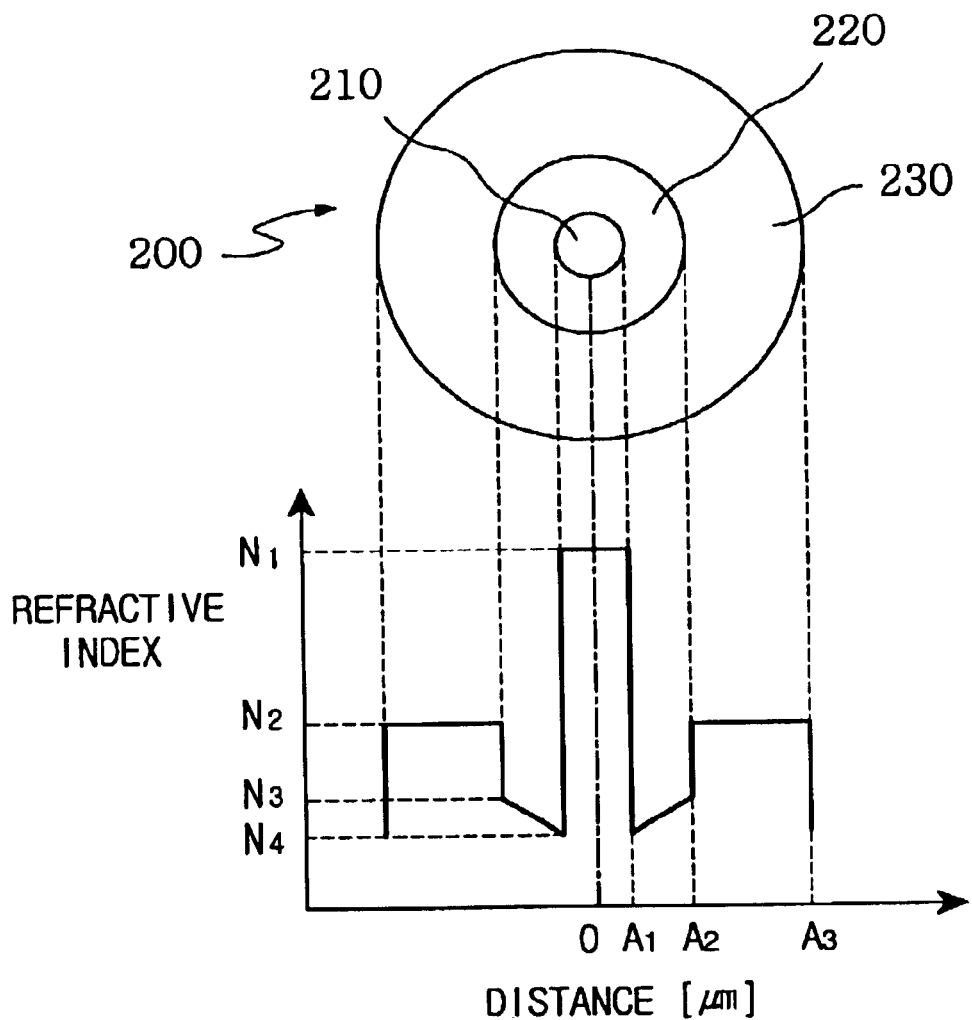
FIG. 2 is a view showing a structure and refractive index profile of a wide band dispersion-controlled fiber in accordance with a first embodiment of the present invention.

FIG. 2 illustrates a structure and a respective refractive index profile of a wide band dispersion-controlled fiber in accordance with a first embodiment of the present invention. As shown in this drawing, the wide band dispersion-controlled fiber 200 has a core 210, a dispersion-controlled layer 220 and cladding 230.

The core 210 is arranged in the center of the wide band dispersion-controlled fiber 200 and has a radius of $A_1$ and a refractive index of $N_1$. The core 210 is bar-shaped and has a dispersion profile is set to a constant value $N_1$. A general formula for the refractive index profile is expressed as in the following equation 2.

$$N(R) = N_1 \left[ 1 - 2\Delta_1 \left(\frac{R}{A}\right)^{\alpha_1} \right]^{1/2} \quad \text{[Equation 2]}$$

where, $R(\leq A)$ is a diametrical distance, $A(\leq A_1)$ a diametrical distance to a certain point within the core 210, $N(R)$ a refractive index according to the R, $N_1$ a peak refractive index of the core 210, $\Delta_1$ a first refractive index difference and $\alpha_1(0<\alpha_1\leq\infty)$ a first shape index determining a shape of the refractive index profile. Further, the first refractive index difference can be expressed as in the following equation 3.

$$\Delta_1 = \frac{(N_1^2 - N_2^2)}{2N_1^2} \approx \frac{(N_1 - N_2)}{N_1} \quad \text{[Equation 3]}$$

where, $N_2$ is a peak refractive index of the cladding 230.

If necessary, the $N_2$ in the equation 3 can be substituted for any value less than the peak refractive index $N_1$ of the core 210 and more than a minimum refractive index $N_4$ of the dispersion-controlled layer 220.

The dispersion-controlled layer 220 is arranged between the core 210 and cladding 230 and has an inner radius $A_1$, an outer radius $A_3$, peak refractive index $N_3$ and the minimum refractive index $N_4$. The dispersion-controlled layer 220 further is tubeshaped and has a refractive index that increases linearly from its inner periphery to its outer periphery. A refractive index profile of the dispersion-controlled layer 220 can be expressed as the following equation 4.

$$N(R) = N_4 \left[ 1 - 2\Delta_2 \left(\frac{R}{A}\right)^{\alpha_2} \right]^{1/2} \quad \text{[Equation 4]}$$

where, the $A(A_1 \leq A \leq A_2)$ is a diametrical distance to any point in the dispersion-controlled layer 220, $R(A_1 \leq R \leq A)$ a diametrical distance, $N_4$ the minimum refractive index of the dispersion-controlled layer 220, $\Delta_2$ a second refractive index difference, $\alpha_2(0<\alpha_2\leq\infty)$ a second shape index determining a shape of the refractive index profile. Further, the second refractive index difference can be expressed by the following equation 5.

$$\Delta_2 = \frac{(N_4^2 - N_3^2)}{2N_4^2} \approx \frac{(N_4 - N_3)}{N_4} \quad \text{[Equation 5]}$$

where, $N_3$ is a peak refractive index of the dispersion-controlled layer 220.

The cladding 230 is arranged outside of the wide band dispersion-controlled fiber 200 and has a radius of $A_3$ and refractive index of $N_2$.

If necessary, the dispersion-controlled layer, according to the present invention, can be implemented in various shapes. This variety of the implemented shapes will be described below with second and third embodiments of the present invention.

Figure 3:
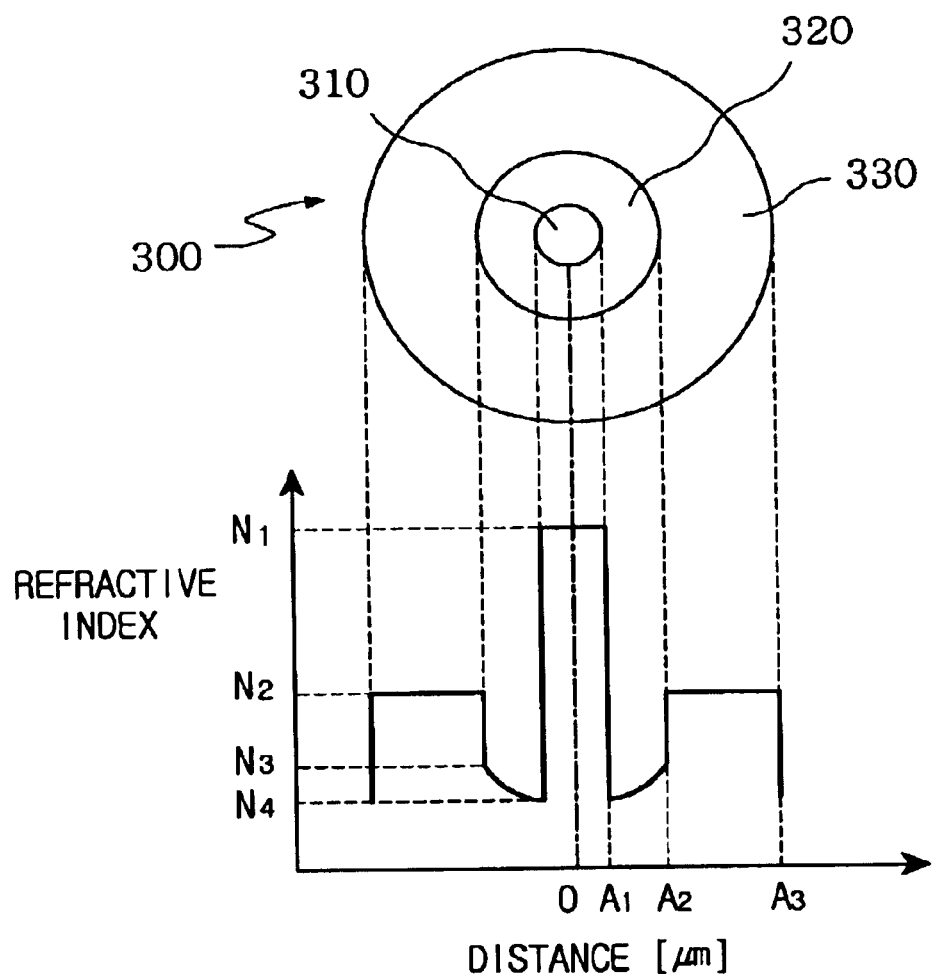
FIG. 3 is a view showing a structure and refractive index profile of a wide band dispersion-controlled fiber in accordance with a second embodiment of the present invention.

FIG. 3 illustrates a structure and a respective refractive index profile of a wide band dispersion-controlled fiber in accordance with the second embodiment of the present invention. As shown in this drawing, the wide band dispersion-controlled fiber 300 has a core 310, dispersion-controlled layer 320 and cladding 330.

The core 310 is arranged in the center of the wide band dispersion-controlled fiber 300 and has a radius of $A_1$ and a refractive index of $N_1$. The core 310 is bar-shaped and has a dispersion profile that is set to a constant value $N_1$.

The dispersion-controlled layer 320 is arranged between the core 310 and cladding 330 and has an inner radius $A_1$, outer radius $A_3$, peak refractive index $N_3$ and minimum refractive index $N_4$. The dispersion-controlled layer 320 further has a tube shape and its refractive index increases curvilinearly from the inner radius to the outer radius.

The cladding 330 is arranged outside of the wide band dispersion-controlled fiber 300 and has a radius of $A_3$ and refractive index of $N_2$.

Figure 4:
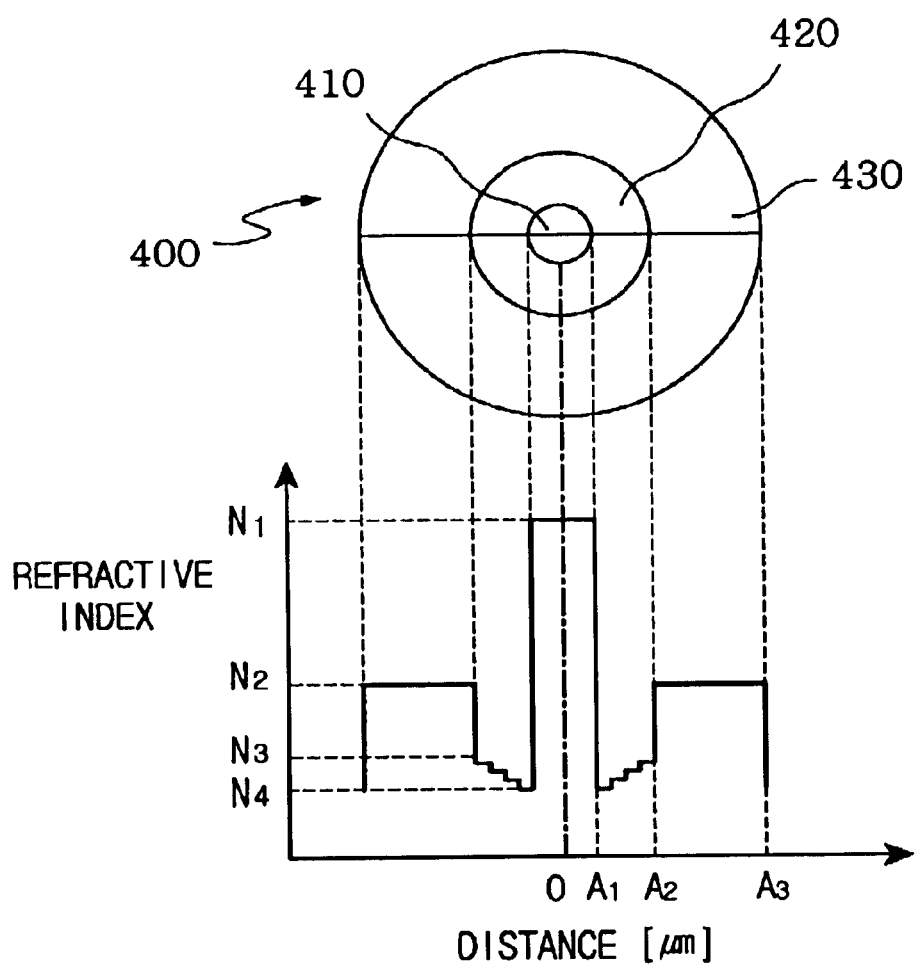
FIG. 4 is a view showing a structure and refractive index profile of a wide band dispersion-controlled fiber in accordance with a third embodiment of the present invention.

FIG. 4 illustrates a structure and a respective refractive index profile of a wide band dispersion-controlled fiber in accordance with the third embodiment of the present invention. As shown in this drawing, the wide band dispersion-controlled fiber 400 has a core 410, dispersion-controlled layer 420 and cladding 330.

The core 410 is arranged in the center of the wide band dispersion-controlled fiber 400 and has a radius of $A_1$ and a refractive index of $N_1$. The core 410 further is bar-shaped and its dispersion profile is set to a constant value $N_1$.

The dispersion-controlled layer 420 is arranged between the core 410 and cladding 430 and has an inner radius $A_1$, an outer radius $A_3$, a peak refractive index $N_3$ and a minimum refractive index $N_4$. The dispersion-controlled layer 420 further has a tube shape and its refractive index increases step-wise from its inner periphery to its outer periphery.

The cladding 430 is arranged outside of the wide band dispersion-controlled fiber 400 and has a radius of $A_3$ and refractive index of $N_2$.

Figure 5:
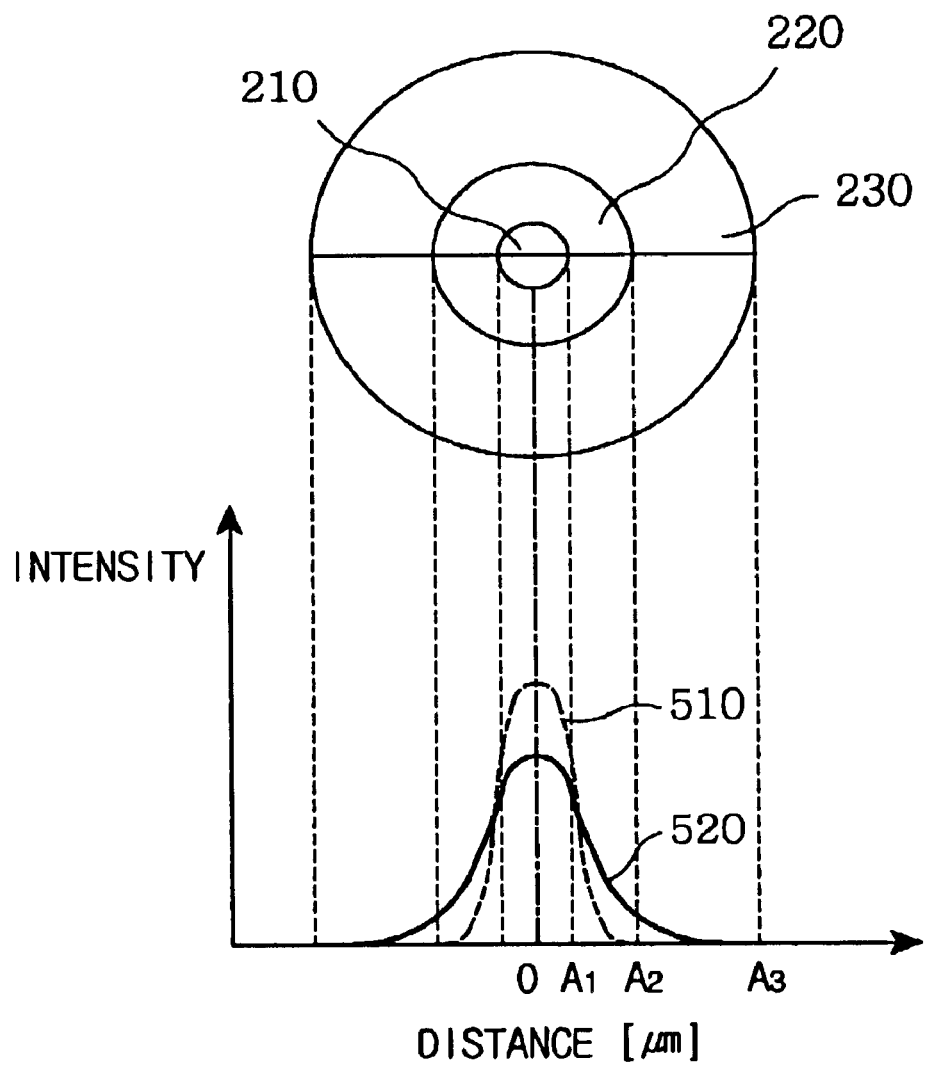
FIG. 5 is a view illustrating a function of the wide band dispersion-controlled fiber in FIG. 2.

FIG. 5 illustrates a function of the wide band dispersion-controlled fiber 200 shown in FIG. 2. This drawing shows intensity curves 510 and 520 for optical signals of shorter and longer wavelengths, which travel through the dispersion-controlled fiber 200. Namely, the curves 510 and 520 represent optical signal intensity profiles corresponding to a certain cross section of the wide band dispersion-controlled fiber 200.

As seen from the intensity curve 510 for the shorter wavelength optical signal, a peak intensity point of the curve 510 is almost identical to the center of the core 210 and the intensity profile is concentrated at a core position. In other words, where the shorter wavelength optical signal travels through the wide band dispersion-controlled fiber 200, the amount of this optical signal which penetrates into the dispersion-controlled layer 220 is relatively small and most of the optical signal travels in the core 210. As a result, the dispersion-controlled layer 220 has a relatively small effect on the shorter wavelength optical signal, in connection with dispersion.

As seen from the intensity curve 520 for the longer wavelength optical signal, a peak intensity point of the curve 510 is almost identical to the center of the core 210 and the intensity profile is dispersed over positions of the core 210 and dispersion-controlled layer 220. In other words, the longer wavelength optical signal penetrates into the dispersion-controlled layer 220 in a relatively great amount as it travels through the wide band dispersion-controlled fiber 200 and a considerable part of the optical signal travels through the dispersion-controlled layer 220. As a result, the dispersion-controlled layer 220 has a relatively great effect on the longer wavelength optical signal, in connection with dispersion.

As a dispersion-characteristic control for the longer wavelength optical signal is made possible, it is possible to control the dispersion curves, according to wavelengths, for the wide band dispersion-controlled fiber 200. This control process will be described step by step below.

Firstly, a dispersion curve by wavelengths of a longer wavelength band is set through controlling respective refractive index profiles of the core 210 and dispersion control layer 220 under the condition that a refractive index profile of the cladding 230 is set to a constant value.

Secondly, a dispersion curve by wavelengths of a shorter wavelength band is set through controlling a slope of a refractive index profile of the dispersion control layer 220.

Figure 6:
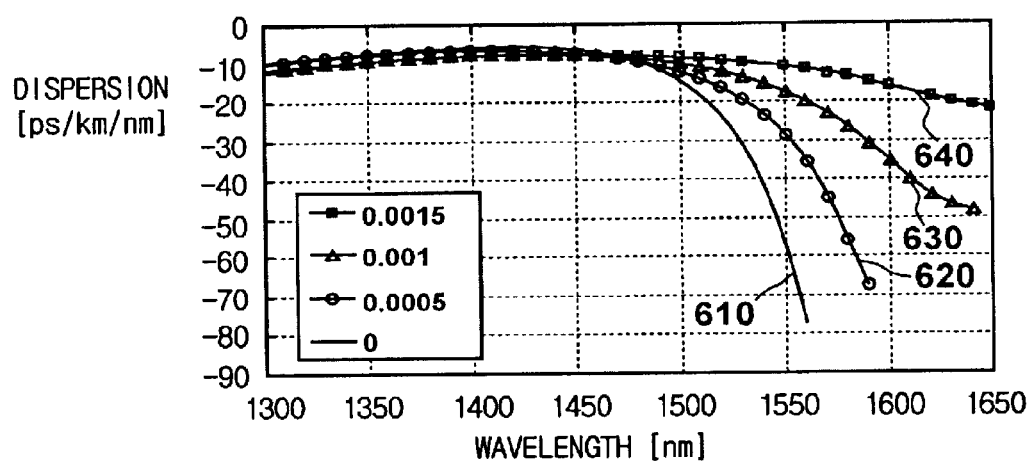
FIG. 6 is a graph illustrating dispersion characteristics of the wide band dispersion-controlled fiber in FIG. 2.

FIG. 6 is a graph illustrating dispersion characteristics of the wide band dispersion-controlled fiber in FIG. 2. This drawing shows a first dispersion curve 610 when the difference between the peak refractive index $N_3$ and the minimum refractive index $N_4$ is zero, a second dispersion curve 620 when the difference is 0.0005, a third dispersion curve 630 when the difference is 0.001 and a fourth dispersion curve 640 when the difference is 0.0015.

The first to fourth dispersion curves 610,620,630 and 640 are so similar to each other that it is difficult to distinguish any one of them from the others in a shorter wavelength band. On the other hand, there is an apparent difference between those dispersion curves in a longer wavelength band, or at wavelengths of 1500 nm or more.

Figure 7:
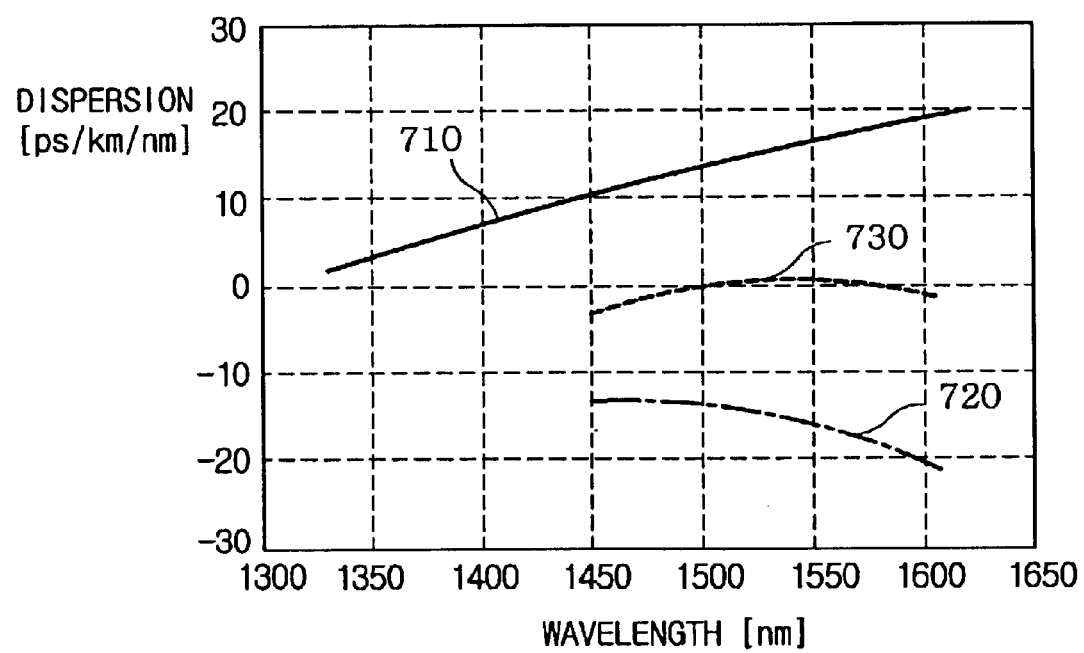
FIG. 7 is a graph illustrating an example of compensating for a dispersion of a single-mode fiber using the wide band dispersion-controlled fiber in FIG. 2.

Referring to FIG. 7, a description will be given regarding a method for compensating for a dispersion and a dispersion slope of a single-mode fiber by controlling respective refractive indexes of the core 210 and dispersion control layer 220 of the wide band dispersion-controlled fiber 200 shown in FIG. 2. FIG. 7 shows a dispersion curve 710 of the single-mode fiber, a dispersion curve 720 of the wide band dispersion-controlled fiber 200 whose dispersion control layer 220 is controlled to adjust its dispersion slope, and a dispersion curve 730 representative of the total dispersion when the single-mode fiber and wide band dispersion-controlled fiber 200 are interconnected at a length ratio of 1:1. As seen from the total dispersion curve 730, the dispersion compensation can be accomplished for a wavelength region including an S-band and L-band as well as a C-band using the wide band dispersion-controlled fiber 200.

As shown in FIGS. 6 and 7, by adjusting the dispersion slope of the dispersion control layer 220, the dispersion and dispersion slope of the dispersion-controlled fiber 200 are adjusted such that the dispersion-controlled fiber 200 has a negative dispersion value, thereby being capable of compensating for the dispersion of the single-mode fiber with the negative dispersion value over a wide band including the S-band, C-band and L-band.

Figure 8:
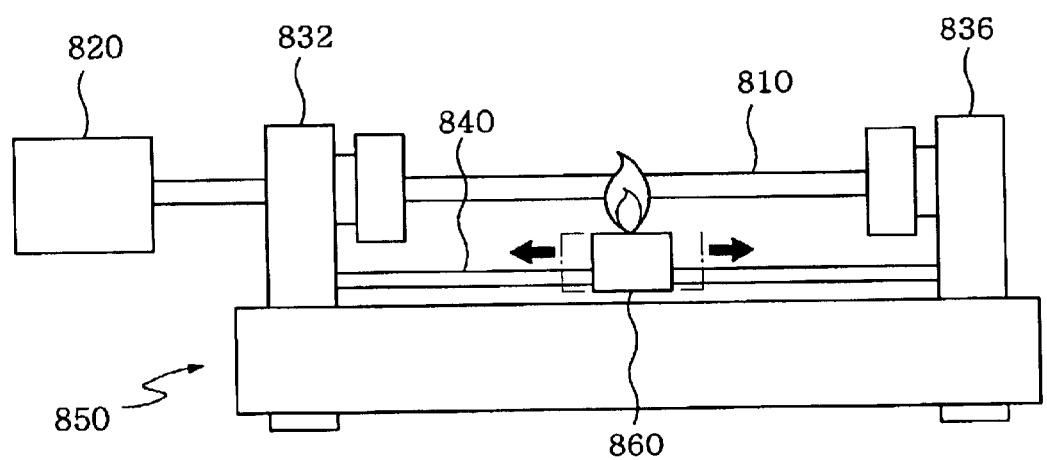
FIG. 8 is a view illustrating a process of manufacturing a preform of the wide band dispersion-controlled fiber in FIG. 2.

With reference to FIG. 8, a description will be given regarding a method for manufacturing a pre-form of the wide band dispersion-controlled fiber in FIG. 2. The fiber pre-form manufacturing method may be MCVD (Modified Chemical Vapor Deposition), VAD (Vapor Phase Axial Deposition), OVD (Outside Vapor Phase Deposition), or so forth. Here, a method for manufacturing the fiber pre-form using the MCVD is described. Because the MCVD is a known art, only condensing and collapsing processes are described.

A pre-form manufacturing apparatus comprises a raw material gas supplier 820, a shelf 850 and an oxygen/hydrogen burner 860.

The raw material gas supplier 820 acts to mix oxygen and a plurality of additives and supplies oxygen and raw material gas, such as $SiCl_4$, $GeCl_4$, $POCl_3$, $CF_4$, $SiF_4$ and so forth, to an inner part of a tube 810. The $GeCl_4$ and $POCl_3$ are used for raising a refractive index of a deposition region and the $CF_4$, and $SiF_4$ for reducing the refractive index of the deposition region. The raw material gas supplier 820 appropriately adjusts amounts of oxygen and raw material gas flowing to the tube 810 to obtain the refractive index profile as shown in FIG. 2. For example, in the case where the dispersion control layer 220 is deposited, as the deposition process is repeatedly performed, the raw material gas supplier 820 adjusts the ratio of $CF_4$ or $SiF_4$, supplied to the deposition tube 810, to the mixture of oxygen, $SiCl_4$, $GeCl_4$, and $POCl_3$ to generate a desired slope of the refractive index. In the case where the core 210 is deposited, as the deposition process is repeatedly performed, the raw material gas supplier 820 adjusts the ratio of $GeCl_4$, supplied to the deposition tube 810, to the mixture of oxygen and $SiCl_4$ to generate a change in the refractive index.

The shelf 850 has a pair of chucks 832 and 836 and a guide 840. The deposition tube 840 is rotatably fixed between the pair of chucks 832 and 836. The guide 840 is movably mounted onto the oxygen/hydrogen burner 860.

The oxygen/hydrogen burner 860 is supplied with oxygen and hydrogen to apply heat to a periphery of the deposition tube 840 while moving along the guide 840 at a constant rate. As a result, a high temperature region is formed at the inner part of the deposition tube 840 and the formed raw material gas passes through the high temperature region to generate a reactant. An associated reaction formula may be expressed by, for example, $SiCl_4+O_2 \rightarrow SiO_2+2Cl_2$ and $GeCl_4+O_2 \rightarrow GeO_2+2Cl_2$. By means of a thermophoretic mechanism, the reactant moves to an inner wall of the deposition tube 810, which is at a relatively low temperature, and is then deposited on the inner wall of the deposition tube 810.

Although one dispersion control layer is provided in the dispersion-controlled fiber in the preferred embodiments of the present invention, multiple dispersion control layers can be arranged between the core and the cladding of the dispersion-controlled fiber if necessary. An intensity profile dispersion of an optical fiber varies with a wavelength from a shorter wavelength to a longer wavelength. In this regard, the multiple dispersion control layers can be employed when there is a need for a finer control of dispersion characteristic-by-wavelength of the wide band dispersion-controlled fiber.

As apparent from the above description, it is possible to control dispersion characteristics of the wide band dispersion-controlled fiber according to the present invention for a longer wavelength band using the refractive index profile of the dispersion control layer thereof. As a result, the wide band dispersion-controlled fiber according to the present invention has an advantage in that it is applicable to a wide band wavelength division multiplexing system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wide band dispersion-controlled fiber comprising:
   a core forming an optical signal transmission path and having a peak refractive index,
   a cladding surrounding the core and having a peak refractive index that is less than the peak refractive index of the core,
   at least one dispersion control layer arranged between the core and the cladding,
   said at least one dispersion control layer having a refractive index profile such that its refractive index increases from an inner periphery to an outer periphery, and wherein said at least one dispersion control layer has a minimum refractive index that is less than the peak refractive indices of the core and cladding.

2. The wide band dispersion-controlled fiber as set forth in claim 1, wherein the dispersion control layer has a peak refractive index less than the peak refractive index of the cladding.

3. The wide band dispersion-controlled fiber as set forth in claim 1, wherein the wide band dispersion-controlled fiber has a negative dispersion value in a wavelength band of 1400–1650 nm.

4. The wide-band dispersion controlled fiber as set forth in claim 1, wherein the where the core has a radius $A_1$, a refractive index of $N_1$ and a dispersion profile is set to a constant value $N_1$, and refractive index profile of the core is expressed according to the following equation:

$$N(R) = N_1\left[1 - 2\Delta_1\left(\frac{R}{A}\right)^{\alpha_1}\right]^{1/2}$$

where, $R(\leq A)$ is a diametrical distance, $A(\leq A_1)$ a diametrical distance to a predetermined point within the core, $N(R)$ a refractive index according to the R, $N_1$ a peak refractive index of the core, $\Delta_1$ a first refractive index difference and $\alpha_1(0<\alpha_1\leq\infty)$ a first shape index determining a shape of the refractive index profile.

5. The wide-band dispersion controlled fiber as set forth in claim 4, wherein the first refractive index is expressed according to $$\Delta_1 = \frac{(N_1^2 - N_2^2)}{2N_1^2} \approx \frac{(N_1 - N_2)}{N_1}$$

where, $N_2$ is a peak refractive index of the cladding.

6. The wide-band dispersion controlled fiber according to claim 1, wherein said at least one dispersion-controlled layer is tube-shaped, and wherein the refractive index of said at least one dispersion-controlled layer increases linearly from an inner periphery to an outer periphery.

7. The wide-band dispersion controlled fiber according to claim 1, wherein the refractive index profile of said at least one dispersion-controlled layer 220 can be expressed according to the following equation:

$$N(R) = N_4\left[1 - 2\Delta_2\left(\frac{R}{A}\right)^{\alpha_2}\right]^{1/2}$$

where, the $A(A_1 \leq A \leq A_2)$ is a diametrical distance to any point in the dispersion-controlled layer 220, $R(A_1 \leq R \leq A)$ a diametrical distance, $N_4$ the minimum refractive index of the dispersion-controlled layer 220, $\Delta_2$ a second refractive index difference, $\alpha_2(0\leq\alpha_2\leq\infty)$ a second shape index determining a shape of the refractive index profile.

8. The wide-band dispersion controlled fiber according to claim 7, wherein the second refractive index difference is expressed by the following:

$$\Delta_2 = \frac{(N_4^2 - N_3^2)}{2N_4^2} \approx \frac{(N_4 - N_3)}{N_4}$$

where, $N_3$ is a peak refractive index of the dispersion-controlled layer.

* * * * *